United States Patent [19]

Mahoney

[11] Patent Number: 5,193,125
[45] Date of Patent: Mar. 9, 1993

[54] LOCAL HIERARCHICAL PROCESSING FOCUS SHIFT WITHIN AN IMAGE

[75] Inventor: James V. Mahoney, Sunnyvale, Calif.
[73] Assignee: Xerox Corporation, Stamford, Conn.
[21] Appl. No.: 537,468
[22] Filed: Jun. 8, 1990
[51] Int. Cl.⁵ .............................................. G06K 9/00
[52] U.S. Cl. ........................................ 382/41; 382/27
[58] Field of Search ...................... 382/27, 40, 41, 48; 358/227, 448; 340/723; 395/128, 129

[56] References Cited

U.S. PATENT DOCUMENTS 5,022,091  6/1991  Carlson ................................ 382/49

OTHER PUBLICATIONS

Ullman, S., "Visual Routines," *Cognition*, vol. 18, 1984, pp. 97–159.
Koch, C., and Ullman, S., "Selecting One Among the Many: A Simple Network Implementing Shifts in Selective Visual Attention," MIT Artificial Intelligence Laboratory, A.I. Memo 770, Jan. 1984, pp. 1–18.

*Primary Examiner*—Leo H. Boudreau

[57] ABSTRACT

And in-place hierarchical technique shifts a spatial processing focus within a two-dimensional array in a SIMD parallel framework. The hierarchical process uniquely associates a rectangular region with each image location at each level of the hierarchy. Each of these regions at a given level is the union of two child regions at the next lower level, one of which is associated with the same image location. In an upward pass, an occupancy bit is stored at each location at each level of the hierarchy, indicating whether the respective region at that level includes any pixels that meet a specified criterion for selecting the new processing focus. In a downward pass, the focus is shifted at each step to a pixel associated with one of the child regions of the region associated with the focus, the child region's occupancy bit being on. This involves a random or arbitrary choice between the two children when both of their occupancy bits are on. The scheme is uniform, local, and parallel; it is particularly efficient because the array contents are never accessed by the central processor.

8 Claims, 5 Drawing Sheets

LOCAL HIERARCHICAL PROCESSING FOCUS SHIFT WITHIN AN IMAGE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques for analyzing a body of data. More specifically, the invention relates to techniques that analyze an image by operating on regions of the image.

Ullman, S., "Visual Routines," *Cognition*, Vol. 18, 1984, pp. 97–159, in section 3.2 beginning on page 123, discusses shifting the processing focus. Section 3.3, beginning on page 129, discusses indexing, describing various ways in which specific locations could be selected for further processing. On a digital computer, the selection could be made by providing the coordinates of the next location to be processed. Indexing, on the other hand, can be described as a shift of the processing focus to special odd-man-out locations, detected in parallel and that serve as anchor points for application of visual routines. Properties such as motion, orientation, and color might be used for indexing, by finding locations that are sufficiently different from their surroundings. Pages 132–134 discuss shifting the processing focus to an indexable location using a central unit to which local detectors provide signals, with the signal from the local detector that detects the odd-man-out inhibiting signals from other local detectors. This scheme could be extended to generate successive shifts of processing focus from one element to another, in an order that depends on the strength of their signals. There is evidence for the use of similarity enhancement, in which, when the processing focus is centered on a given item, similar items become more likely to be processed next.

SUMMARY OF THE INVENTION

One aspect of the invention is based on the recognition of a problem that arises in shifting focus in hierarchical image analysis. One known method of shifting focus, in a conventional image hierarchy such as a tree, is to select a destination pixel by first making an upward pass through the hierarchy and then a downward pass, with the downward pass leading to the destination pixel. The upward pass can find those pixels that meet a new focus criterion, such as by finding the pixels that have a salient value. If the upward pass finds more than one pixel meeting the new focus criterion, the downward pass can arbitrarily choose between those pixels.

A problem arises in shifting focus on a SIMD machine, because the choice of the next pixel must not require the central controller to access the contents of a currently selected processing unit, as such access would itself require a pass through the hierarchy.

This aspect is further based on the recognition that this problem can be solved by performing the downward pass through the array of pixel data items, shifting the data items in the array in such a way that the information necessary to choose the next pixel is locally available at the pixel data item that is the current focus. The data item is shifted so that the current focus data item includes data indicating which of its children meets the new focus criterion. If both do, a local choice can be made between the children.

The following description, the drawings and the claims further set forth these and other objects, features and advantages of the invention.

DETAILED DESCRIPTION

A. Conceptual Framework

The following conceptual framework is helpful in understanding the broad scope of the invention, and the terms defined below have the meanings indicated throughout this application, including the claims. This conceptual framework is an extension of that set forth in copending, coassigned U.S. patent application Ser. No. 07/535,796, entitled "Dense Aggregative Hierarchical Techniques for Data Analysis" ("the architecture application"), which is incorporated herein by reference in its entirety.

A "data processor" or "processor" is any component, combination of components, or system that can process data, and may include one or more central processing units or other processing components. A "processing unit" is a processor that is a component within another processor.

"Memory" is any component, combination of components, or system that can store data, and may include local and remote memory and input/output devices. A "memory array" is a memory that includes a plurality of locations between which data can be shifted along one or more dimensions defined within the array.

A processor "accesses" data by any operation that retrieves or modifies the data, such as by reading or writing data at a location in memory. A processor can be "connected for accessing" data by any combination of connections with memory that permits the processor to access the data.

A processor "operates on" data by performing an operation that includes obtaining a logical or arithmetic result that depends on the data.

To "obtain" or "produce" data is to perform any combination of operations that begins without the data and that results in the data. Data can be "obtained from" or "produced from" other data by any combination of operations that obtains or produces the data by operating on the other data.

An item of data is produced by "combining" other items of data when logical or arithmetic operations are performed on the other items of data that yield an item of data of the same type. For example, if the other items of data are simple booleans, the combined item of data is a simple boolean. If the other items of data are numbers, the combined item of data could be a number, produced by adding the other items of data, calculating the mean of the other items of data, selecting one of the other items of data, or a similar operation that produces a number.

A "hierarchy" of data items includes data items, each of which is at one of a series of levels within the hierarchy. To "produce" a hierarchy of data items is to perform a combination of operations that begins without the complete hierarchy of data items and that includes the production of all of the data items of the hierarchy that are not present at the begining. In other words, a hierarchy may be produced by a combination of operations that ends when all of the data items of the hierarchy have been produced, whether or not all of the data items are still stored. All of the data items of all of the levels could still be stored at the end of the operations, but the hierarchy is produced even though some of the data items are not stored after being used to produce data items at a higher level.

To produce a hierarchy "sequentially" is to produce the hierarchy by a sequence of substeps in which the first substep produces a first higher level of data items from a lowest level of data items, the second substep produces a second higher level of data items from the first higher level, and so forth.

Data "indicates" an attribute when the data indicates the presence of the attribute or a measure of the attribute.

An "image" is a pattern of light. Data "defines" an image or another signal when the data includes sufficient information to produce the image or signal.

Each location in an image may be called a "pixel." In an array defining an image in which each item of data provides a value, each value indicating the color of a location may be called a "pixel value."

An "analysis region" or "region" of a data space or of any of the bodies of data that can be mapped into the data space is a bounded part of the data space, defined without regard to the values of the data items mapped into the analysis region. A region of the array defining an image defines an analysis region of the image, so that an aggregative data item defines an attribute of an analysis region of an image when it indicates an attribute of the data items in an analysis region of the array defining the image. The attribute could, for example, be the presence of exactly one connected component in a respective analysis region. The size and position of the aggregative data item's respective analysis region do not depend on the presence or absence of a connected component, but rather on the set of data items on which operations are performed to produce the aggregative data item. An image is therefore divided into analysis regions by the aggregative operations performed on an array defining the image in a way that does not depend on the pixel values in the image. Typically, each pixel value is in at least one analysis region at the lowest level of the hierarchy, and the analysis regions of each higher level are formed by combining analysis regions of the next lower level. Analysis regions "overlap" if they share one or more pixels.

B. General Features

Figure 1:
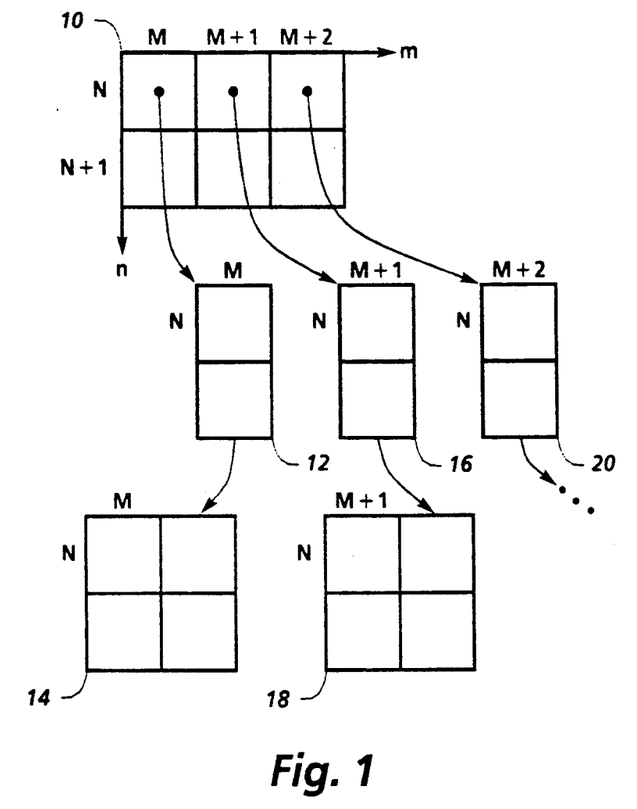
FIG. 1 is a schematic diagram showing how a sequence of analysis regions of increasing size can be defined.
Figure 2:
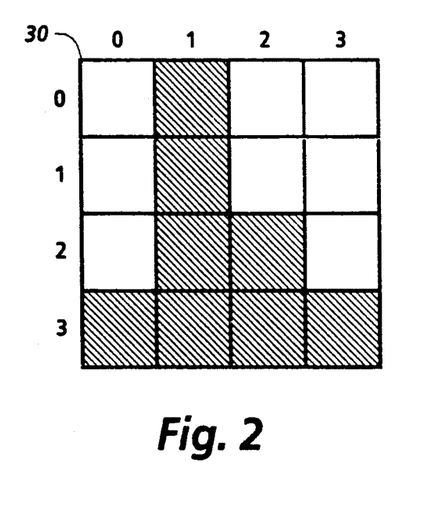
FIG. 2 shows a simple binary image.
Figure 3:
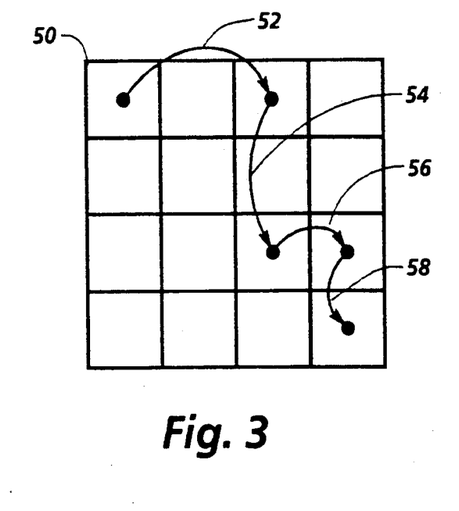
FIG. 3 is a schematic diagram showing how a focus can be shifted within the image of FIG. 2 according to the invention.
Figure 4:
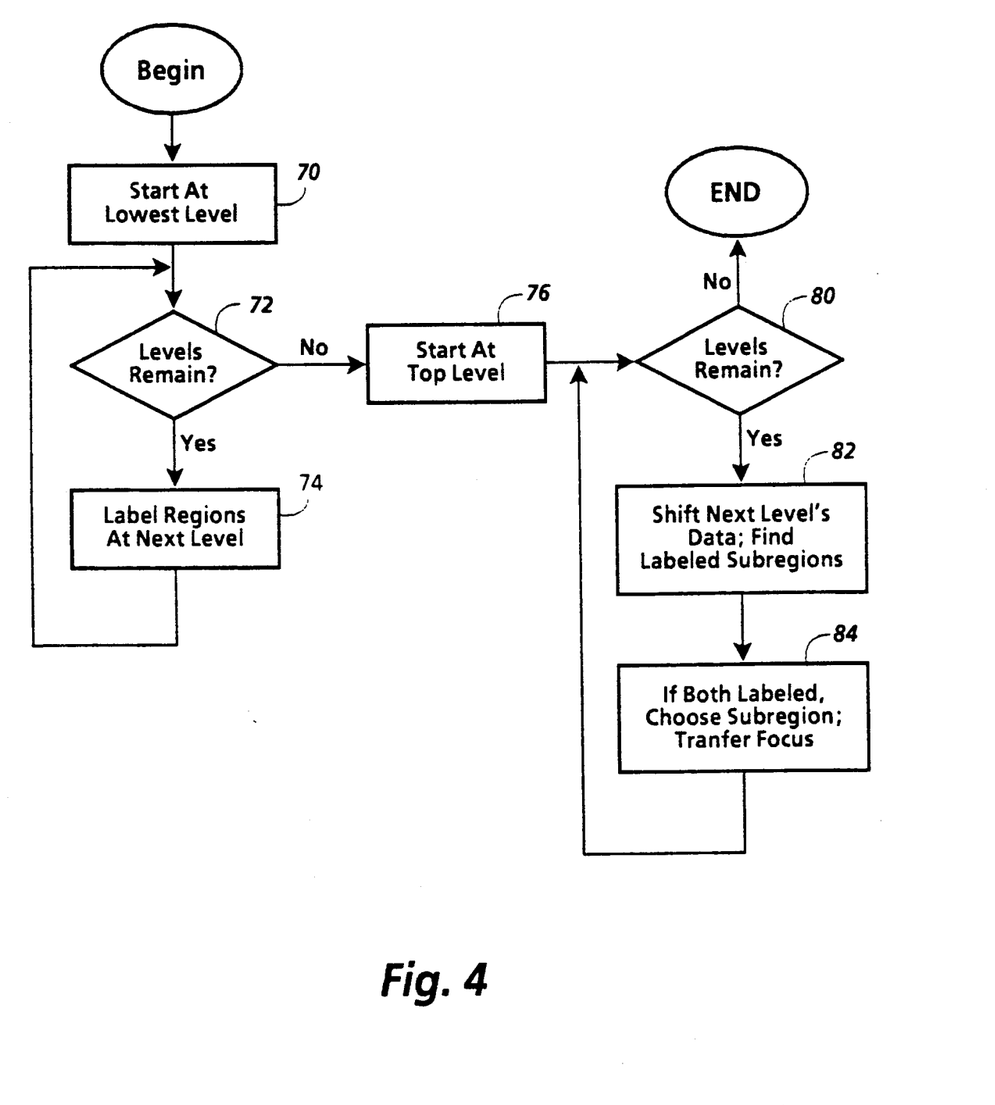
FIG. 4 is a flow chart showing general steps in shifting focus according to the invention.

FIGS. 1-4 illustrate general features of the invention. FIG. 1 shows, for each of several pixels in an image, a sequence of respective regions of increasing size. FIG. 2 is a simple image used for the example in FIG. 3. FIG. 3 illustrates a focus shifting technique. FIG. 4 shows general steps in shifting focus with local hierarchical operations.

FIG. 1 shows fragment 10 of a two-dimensional binary image, each of whose pixels can be designated as (m, n) using coordinates as shown. For each pixel, a sequence of respective regions of increasing size can be defined, within each of which the pixel occupies the same position, such as the upper left corner. For pixel (M, N) in fragment 10, the respective regions include two-pixel region 12 and four-pixel region 14; for pixel (M+1, N), two-pixel region 16 and four-pixel region 18; for pixel (M+2, N), two-pixel region 20 and a four-pixel region (not shown); and so forth. Each pixel's respective two-pixel region includes the neighboring pixel below it in fragment 10, so that, for example, two-pixel region 12 includes the two neighboring pixels (M, N) and (M, N+1). Similarly, each pixel's respective four-pixel region includes its own respective two-pixel region and the respective two-pixel region of the neighboring pixel to its right in fragment 10, so that, for example, four-pixel region 14 includes the pixels in regions 12 and 16, including pixels (M, N), (M, N+1), (M+1, N), and (M+1, N+1).

FIG. 2 shows binary image 30, a simple image in which black pixels are shown shaded. Binary image 30 can be used to illustrate a focus shifting technique.

FIG. 3 illustrates a focus shifting technique. Before the steps illustrated by schematic array 50 in FIG. 3, an upward pass is performed on image 30 in FIG. 2, treating each of the black pixels as a possible destination of the focus shift. The upward pass produces a hierarchy of data items, each indicating whether its respective region in image 30 includes at least one pixel that is a possible destination. This upward pass would produce a boolean value of 1 for a region with at least one possible destination pixel and a boolean value of 0 for a region with no possible destination pixels.

FIG. 3 shows schematically the path followed by a downward pass through the hierarchy beginning at the top level data item of the upper left hand pixel, pixel (0, 0) in FIG. 2. The step shown by arc 52 chooses an eight-pixel region whose upper left hand pixel is pixel (2, 0) in FIG. 2. Arc 52 can result from a random decision, since the eight-pixel region with its upper left hand corner at pixel (0, 0) also includes a possible destination pixel. The step shown by arc 54 chooses a four-pixel region with its upper left hand corner at pixel (2, 2), because the four-pixel region with its upper left hand corner at pixel (2, 0) does not include a possible destination pixel. The step shown by arc 56 chooses a two-pixel region at pixel (3, 2), which can result from a random decision. Finally, the step shown by arc 58 chooses pixel (3, 3) since pixel (3, 2) is a white pixel. Pixel (3, 3) thus becomes the current focus.

FIG. 4 shows general steps in an operation that performs an upward and downward pass as described above. The step in box 70 prepares for the upward pass by starting at the lowest level of the hierarchy. The step in box 72 begins an iterative loop that, in box 74, labels each region on the next level with data indicating whether it includes a pixel that meets the new focus criterion.

When all the levels of the hierarchy have been labeled, the step in box 76 prepares for the downward pass by starting with a current focus region at the top level of the hierarchy that includes a pixel that meets the new focus criterion. Then, the step in box 80 begins an iterative loop that, in box 82, shifts the data at the next level of the hierarchy so that the data item of the current focus region has sufficient information to determine which of its subregions are labeled as including a pixel meeting the new focus criterion. If both pixels are labeled, the step in box 84 chooses one of the subregions and transfers the focus to it. If only one pixel is labeled, this step transfers the focus to the pixel that is labeled. When the operation reaches the lowest level, the pixel with the current focus is pixel that meets the new focus criterion.

C. An Implementation

The invention has been implemented on a Connection Machine from Thinking Machines Corporation, using the in-place implementation techniques described in the architecture application to produce exhaustive hierarchies of data items.

Figure 5:
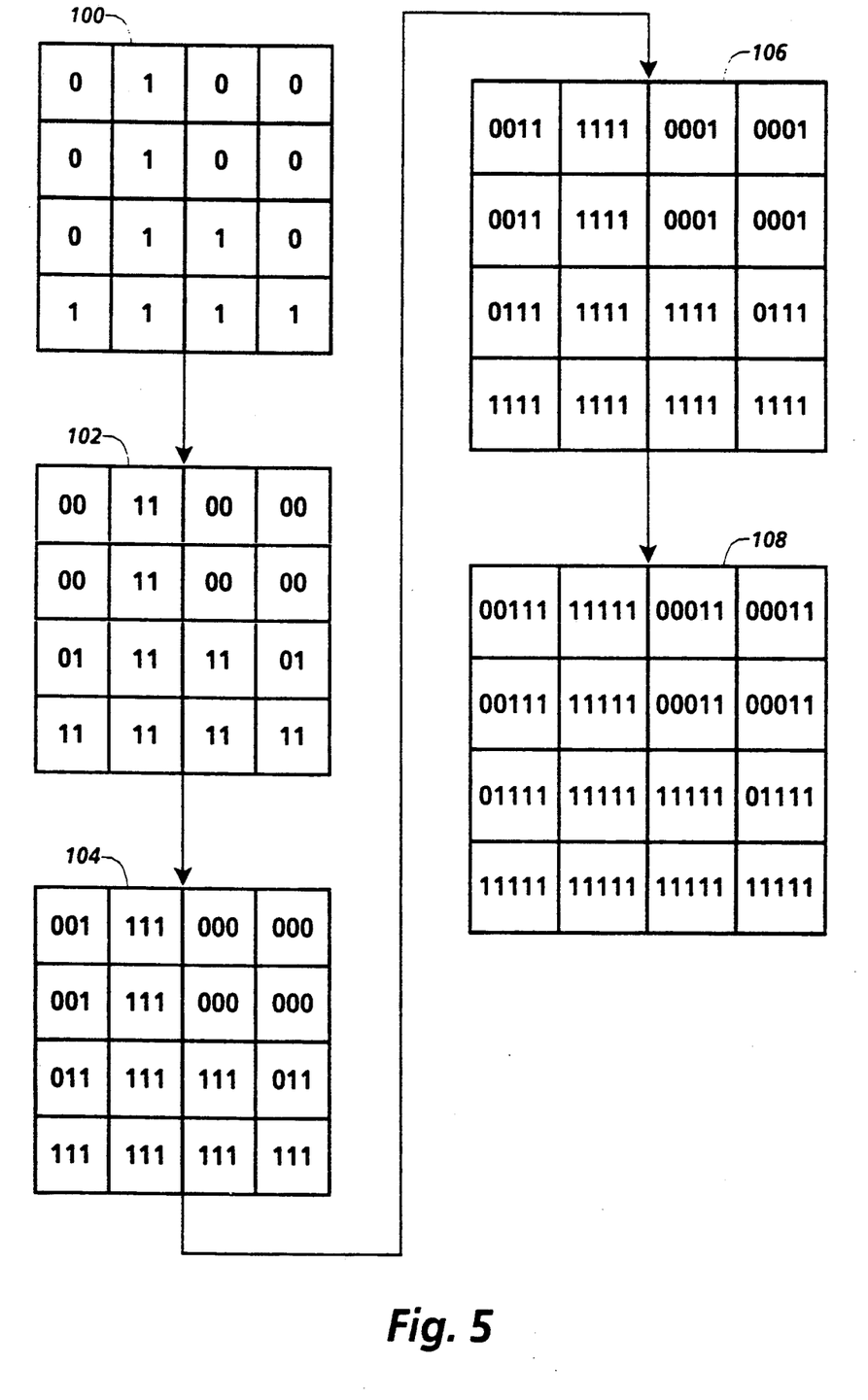
FIG. 5 is a flow diagram showing a sequence of arrays of bit vectors produced in an upward hierarchical pass.

FIG. 5 illustrates arrays of bit vectors produced by an upward hierarchical pass using the in-place implementation. The final array can then be used during the downward pass in determining which subregion includes a pixel that meets the new focus criterion.

Array 100 is the lowest level of the hierarchy, and includes, for each pixel, a bit indicating whether the pixel meets the new focus criterion. The bits of array 100 are obtained by applying a black pixel criterion to array 30 in FIG. 2. Numerous other criteria would be appropriate, of course, such as a criterion that a pixel have a value that is salient in relation to the global distribution of a given attribute.

Array 102 is the second level of the hierarchy in which each pixel's vector includes a second bit indicating whether the rectangular two-pixel region including the pixel and the first pixel below it includes a pixel meeting the criterion. Similarly, in array 104, each pixel's vector includes a third bit indicating whether the square four-pixel region including the pixel's rectangular two-pixel region and the rectangular two-pixel region of the first pixel on its right includes a pixel meeting the criterion. The fourth bit in array 106 indicates whether a rectangular eight-pixel region includes a pixel meeting the criterion and the fifth bit in array 108 indicates whether a square 16-pixel region includes such a pixel.

Figure 6:
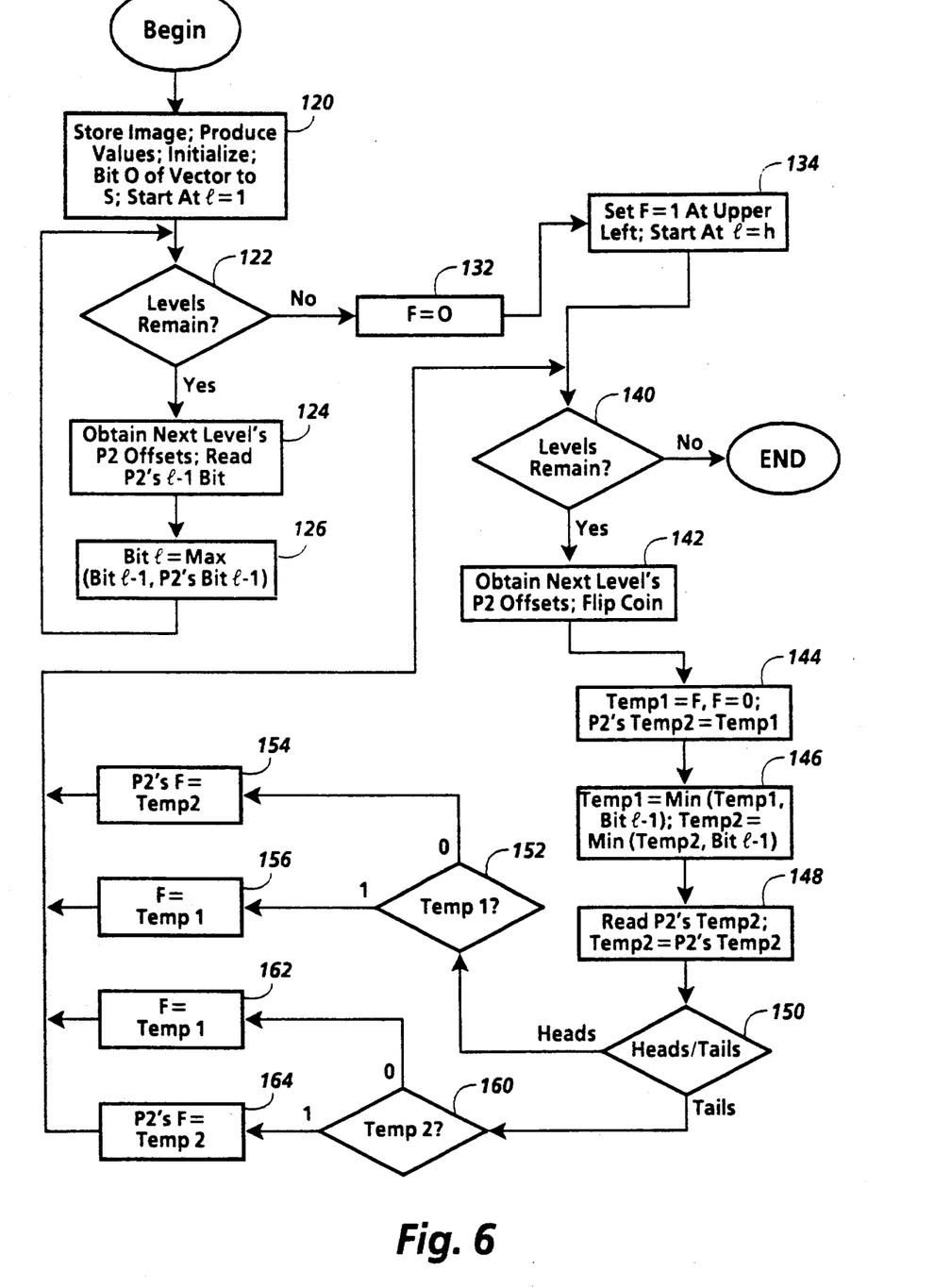
FIG. 6 is a flow chart showing steps of a focus shifting operation that produces bit vectors like those in FIG. 5 and then uses the bit vectors in making a downward pass.

FIG. 6 shows an operation that produces the bit vectors of FIG. 5 and then uses them to shift focus. The step in box 120 begins by storing the image and performing any operations necessary to obtain a boolean value S for each pixel indicating whether it meets the new focus criterion. The step in box 120 then initializes, setting bit 0 of each pixel's vector equal to S and preparing for an upward pass by starting at the lowest level, l=1.

The step in box 122 begins an iterative loop that performs the upward pass. The step in box 124 obtains the next level's P2 offsets and reads the bit for the level l−1 in P2's vector. The step in box 126 then sets bit l of the vector to the maximum of the value of bit l−1 and P2's bit l−1.

When the complete bit vector has been produced in this manner, the step in box 132 sets the current focus label F to zero. Then, the step in box 134 sets F to one for the pixel in the upper left corner of the image and prepares for a downward pass by starting at the top level, l=h.

The step in box 140 begins an iterative loop that performs the downward pass. The step in box 142 obtains the next level's P2 offsets and performs a random binary choice operation, equivalent to flipping a coin. The step in box 144 copies F to Temp1 in each processing unit, sets F to zero, and copies the contents of Temp1 to Temp2 in P2. Then, the step in box 146 sets Temp1 to the minimum of its current value and the value in bit l−1 in the vector; this step also sets Temp2 to the minimum of its current value and the value in bit l−1 in the vector. A value of one in Temp1 at a given location now indicates that the focus coincides with that location, and that the corresponding region at the next lower level contains some pixels meeting the criterion for a new focus. A value of one in Temp2 at a given location now indicates that the focus may in a single operation be shifted that location (i.e. the focus coincides with that location's parent), and that the corresponding region at the next lower level contains some pixels meeting the criterion for a new focus. The operation in box 148 shifts Temp2 data by the appropriate offset, so that subsequently a value of one in Temp2 at a given location indicates that the focus coincides with that location, and that the second child region of the corresponding region contains some pixels meeting the criterion for a new focus.

The step in box 150 then branches based on whether the coin flip in box 142 yielded heads or tails. If heads, the step in box 152 branches based on the value of Temp1, which indicates whether it is necessary to shift to P2. If Temp1 is zero, the step in box 154 shifts by setting P2's F bit to the value of Temp2, which could be either zero or one. If Temp1 is one, the step in box 156 sets F to the value of Temp1. Similarly, if tails, the step in box 160 branches based on the value of Temp2, which indicates whether it is possible to shift to P2. If Temp2 is zero, the step in box 162 does not shift, but sets F to the value of Temp1, which could be either zero or one. If Temp2 is one, the step in box 164 shifts by setting P2's F bit to the value of Temp2.

The coin flipping rule applied by the step in box 150 serves to randomly choose between the first child and the second child in those cases in which each includes a pixel meeting the criterion. It could be replaced by another criterion that systematically favored one child or the other in that situation.

Figure 7:
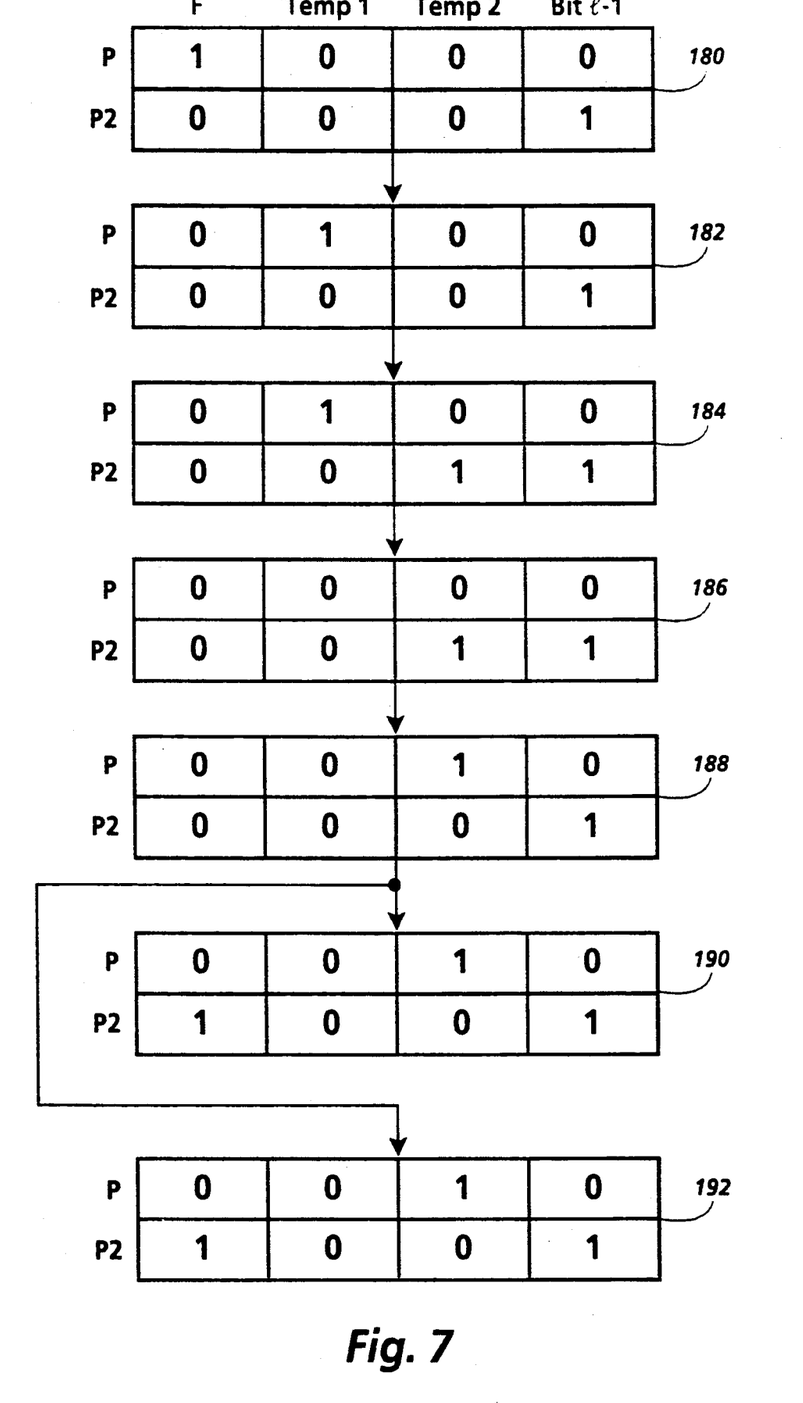
FIG. 7 is a flow diagram showing a sequence of arrays of bits in local memory of processing units in the downward pass of FIG. 6.

FIG. 7 illustrates graphically the operations performed in boxes 144–164 of FIG. 6. Each array in FIG. 7 shows the value in four bits in the local memory of a processing unit P and its second child processing unit P2.

Array 180 shows the values before the step in box 144, with P the current focus, as indicated by the one in its F bit. Also, bit l−1 in P's vector is zero, while bit l−1 in P2's vector is one, so that P's first child does not include a pixel meeting the criterion, while P's second child does.

Array 182 results from part of the step in box 144, in which Temp1 has been set to the value in F and F has been cleared to zero. Array 184 results from the remainder of the step in box 144, in which a shift has taken place from P to P2, so that P2's Temp2 is set to the value in P's Temp1.

Array 186 results from the step in box 146, in which Temp1 and Temp2 are each set to a minimum. Because bit 1−1 is zero in P's vector, P's Temp1 is changed to zero. At this point, Temp1 indicates whether the first child includes a pixel that meets the criterion.

Array 188 results from the step in box 148, another shift in which P2's Temp2 is shifted back to P, so that Temp2 indicates whether the second child includes a pixel that meets the criterion. The operation then branches based on whether the coin flip produced a head or a tail. Array 190 results from a head and array 192 from a tail, although the two are the same because P2 becomes the new current focus in either case.

D. Source Code Appendix

Appendix A is source code for implementing some of the features described above. The source code in Appendix A may differ in some respects from the above description, but execution of the source code in Appendix A on a Connection Machine provides substantially all the features described above. In some cases, the code has been optimized or includes additional features. Source code for implementing other features is included in copending coassigned U.S. patent application Ser. No. 07/535,438, entitled "Exhaustive Hierarchical Near Neighbor Operations on an Image" and Ser. No. 07/535,796, entitled "Dense Aggregative Hierarchical Techniques for Data Analysis," both of which are incorporated herein by reference in their entirety.

The following are included in Appendix A:

The function SHIFT-RANDOM shifts the processing focus to a randomly selected pixel.

E. Miscellaneous

The invention has been described in terms of operations on binary images, but could be applied to images of all types and, more generally, to bodies of data that map into arrays similar to those described.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

---

APPENDIX A
© 1990 Xerox Corporation. All rights reserved.

```
;;;-*-Syntax: Common-lisp;mode: lisp; package: REVERSE-GRAPHICS; base: 10-*-
;;; This file contains operations that are applications of image
;;; chunking and labeling.
;; selected, active, focus, and value are conventional names often used
;; below as pvar parameters and internal pvars of functions. They
;; should be interpreted as pvars unless otherwise indicated. The
;; suffixes -pvar and -scalar are used when there is any ambiguity.
;; selected, active, and focus are always 1-bit pvars. value is always
;; a field pvar with enough bits to hold the relevant result.
;;;-------------------------------------------------------------------
;;; Indexing
(defmacro PARENT <-CHILD-1 + CHILD-2-b (pvar combination-function)
   (*locally
    (declare (type (filed-pvar (pvar (pvar-length ,pvar)) ,pvar))
    (loop for l from 1 to top-chunking-level
         for cl = (l-1) do
         (setf (bit-refl! ,pvar l)
            (,combination-function
               (child-refl! (bit-refl! ,pvar cl) 1 l)
               (child-refl! (bit-refl! ,pvar cl) 2 l) )))))
;; This function implements the upward hierarchical process for
;; establishing region occupancy.
(defun FLOAT-OR (value-pvar)
   (parent <-child-1 + child-2-b value-pvar or01!!))
;; This function implements the shift operation.
;; It includes both the upward and downward passes. The
;; call to FLOAT-OR comprises the upward pass.
(defun SHIFT-RANDOM (selected focus)
   (*locally
     (declare (type (field-pvar 1) focus selected))
     (*set focus (!! 0))
     (*let ((projpvar (!! 0)) (projpvar2 (!! 0)) (temp (!! 0)) (occupancy (!! 0)))
       (declare (type (field-pvar 1) projpvar projpvar2 temp)
          (type (field-pvar 19) occupancy))
       (setf (bit-refl! occupancy 0) selected)
       (float-or occupancy)
       (setf (pref-grid projpvar 0 0) 1)
       (loop for l from top-chunking-level downto 1
            for cl = (l-1) do
            (setf (child-refl! temp 2 l) projpvar)
            (*when (and!! (plusp!! temp)
                   (plusp!! (bit-refl! occupancy cl)))
               (*set projpvar2 temp))
            (cond
              ((plusp (random 2))       ;jump whenever you can
               (*when (and!! (plusp!! projpvar)
                      (plusp!! (child-refl! projpvar2 2 l)))
                  (*set projpvar (!! 0))
                  (setf (child-refl! projpvar 2 l)
                     (child-refl! projpvar2 2 l))))
```

-continued

APPENDIX A
© 1990 Xerox Corporation. All rights reserved.

```
(t         ;jump only when you must
 (*when (and!! (plusp!! projpvar)
     (zerop!! (bit-ref!! occupancy cl)))
  (*when (and!! (plusp!! projpvar)
     (plusp!! (child-ref!! projpvar2 2 l)))
  (*set projpvar (!! 0))
  (setf (child-ref!! projpvar 2 l)
     (child-ref!! projpvar2 2 l))))))
 (*set temp (!! 0)))
 (*set focus projpvar))))
;; This operation shifts preferentially to the first child.
(defun SHIFT-ANY (selected focus)
 (*locally
  (declare (type (field-pvar 1) focus selected))
  (*set focus (!! 0))
  (*let ((projpvar (!! 0)) (projpvar2 (!! 0)) (temp (!! 0)) (occupancy (!! 0)))
   (declare (type (field-pvar 1) projpvar projpvar2 temp)
     (type (field-pvar 19) occupancy))
   (setf (bit-ref!! occupancy 0) selected)
   (float-or occupancy)
   (setf (pref-grid projpvar 0 0) 1)
   (loop for l from top-chunking-level downto 1
     for cl = (1-l) do
    (setf (child-ref!! temp 2 l) projpvar)
    (*when (and!! (plusp!! temp)
       (plusp!! (bit-ref!! occupancy cl)))
     (*set projpvar2 temp))
    (*when (and!! (plusp!! projpvar)
       (zerop!! (bit-ref!! occupancy cl)))
     (*when (and!! (plusp!! projpvar)
       (plusp!! (child-ref!! projpvar2 2 l)))
      (*set projpvar (!! 0))
      (setf (child-ref!! projpvar 2 l)
       (child-ref!! projpvar2 2 l))))
    (*set temp (!! 0)))
   (*set focus projpvar))))
```

What is claimed:

1. A method of operating a system that includes a memory array and a processor connected for accessing the memory array, the method comprising steps of:

storing in the memory array a body of data defining an image that includes a plurality of pixels, the body of data including a respective pixel data item for each of the pixels; each pixel's respective pixel data item including current focus data indicating whether the pixel is a current focus pixel; and operating the processor to set the current focus data of a first one of the pixels to indicate that the first pixel is the current focus pixel; the step of operating the processor comprising a substep of:

shifting the current focus data of all the pixels within the array so that the current focus data of a second pixel is shifted to the first pixel's respective pixel data item to set the first pixel's current focus data.

2. The method of claim 1 in which the processor includes a plurality of processing units, each pixel having a respective processing unit, the memory array including respective local memory for each of the processing units, each pixel's respective processing unit having the respective pixel data item stored in its respective local memory, the respective local memories of the respective processing units of the first and second pixels having a connection for shifting data between the local memories; the substep of shifting the current focus data comprising a substep of using the connection to shift the current focus data in the second pixel's respective pixel data item from the respective local memory of the second pixel's respective processing unit to the respective local memory of the first pixel's respective processing unit.

3. The method of claim 1, further including a step of operating the processor to determine whether to set the first pixel's current focus data; the step of operating the processor to set the current focus data of the first pixel being performed if the processor determines to set the first pixel's current focus data.

4. The method of claim 3 in which the first pixel's respective data item includes focus criterion data indicating whether a respective region that includes the first pixel meets a new focus criterion; the step of operating the processor to determine whether to set the first pixel's current focus data comprising substeps of:

shifting the second pixel's current focus data to the first pixel's respective pixel data item;

using the shifted current focus data and the focus criterion data to produce temporary data indicating whether the second pixel is the current focus pixel and the first pixel meets the new focus criterion; and shifting the temporary data to the second pixel's respective pixel data item.

5. The method of claim 3 in which the step of operating the processor to determine whether to set the first pixel's current focus data comprises a substep of using a random binary choice in determining whether to set the first pixel's current focus data.

6. The method of claim 1, further comprising a step of operating the processor to choose between the first and second pixels; the step of operating the processor to set the current focus data of the first pixel being performed if the processor chooses the first pixel.

7. The method of claim 6 in which the step of operating the processor to choose between the first and second pixels comprises a substep of using a random choice in choosing between the first and second pixels.

8. The method of claim 6 in which the processor includes a plurality of processing units, each pixel having a respective one of the processing units; the processor further including a central controller connected for accessing the processing units; the step of operating the processor to choose between the first and second pixels being performed without operating the central controller to access the processing units.

* * * * *